US011668857B2

(12) United States Patent
Delmas et al.

(10) Patent No.: US 11,668,857 B2
(45) Date of Patent: Jun. 6, 2023

(54) DEVICE, METHOD AND COMPUTER PROGRAM PRODUCT FOR VALIDATING DATA PROVIDED BY A RAIN SENSOR

(71) Applicant: SUEZ INTERNATIONAL, Paris la Défense (FR)

(72) Inventors: Simon Delmas, Le Pecq (FR); Jérôme Schoorens, Le Pecq (FR)

(73) Assignee: SUEZ INTERNATIONAL, Paris la Défense (FR)

( * ) Notice: Subject to any disclaimer, the term of this patent is extended or adjusted under 35 U.S.C. 154(b) by 327 days.

(21) Appl. No.: 17/048,518

(22) PCT Filed: Apr. 17, 2019

(86) PCT No.: PCT/EP2019/059883
§ 371 (c)(1),
(2) Date: Oct. 16, 2020

(87) PCT Pub. No.: WO2019/201975
PCT Pub. Date: Oct. 24, 2019

(65) Prior Publication Data
US 2021/0364670 A1    Nov. 25, 2021

(30) Foreign Application Priority Data

Apr. 17, 2018 (FR) ...................................... 1853324

(51) Int. Cl.
*G01W 1/14*    (2006.01)
*G01S 13/95*    (2006.01)

(52) U.S. Cl.
CPC ............. *G01W 1/14* (2013.01); *G01S 13/951* (2013.01)

(58) Field of Classification Search
CPC ....................................................... G01W 1/14
(Continued)

(56) References Cited

U.S. PATENT DOCUMENTS 7,471,234 B1 * 12/2008 Lang ....................... G01S 7/295
342/179
7,920,997 B2 * 4/2011 Domijan, Jr. ........... G01W 1/10
703/2

FOREIGN PATENT DOCUMENTS

FR    3 052 567 A1    12/2017
JP    2004-361314 A    12/2004
JP    2005-17266 A    1/2005

OTHER PUBLICATIONS

Wardah et al., "Radar Rainfall Estimates Comparison with Kriging Interpolation of Gauged Rain," 2011, IEEE, pp. 1-5. (Year: 2011).*

(Continued)

*Primary Examiner* — Ricky Go
(74) *Attorney, Agent, or Firm* — BakerHostetler

(57) ABSTRACT

A method allowing data delivered by a rain gauge to be validated in real time is provided. The method includes steps of: receiving, in a defined time window, pluviometric data from a gauge and weather data from at least one weather radar; computing a coefficient of gauge/radar similarity between the pluviometric data received from the gauge and the weather data received from the at least one weather radar; comparing the value of the coefficient of obtained gauge/radar similarity to a threshold gauge/radar value; and validating the pluviometric data of the gauge if the value of the coefficient of gauge/radar similarity is higher than or equal to the threshold gauge/radar value.

16 Claims, 5 Drawing Sheets

(58) Field of Classification Search
USPC .......................................................... 702/3
See application file for complete search history.

(56) References Cited

OTHER PUBLICATIONS

Teschl et al., "Weather Radar Estimates of Rainfall Adjusted to Rain Gauge Measurements Using Neural Networks," 2006, International Joint Conference on Neural Networks, pp. 5126-5131. (Year: 2006).*
Nunez et al., "On the Spatial Structure of Rainfall Rate: Merging Radar and Rain Gauge Data," 2008, IWSSC, pp. 1-4. (Year: 2008).*

* cited by examiner

DEVICE, METHOD AND COMPUTER PROGRAM PRODUCT FOR VALIDATING DATA PROVIDED BY A RAIN SENSOR

CROSS-REFERENCE TO RELATED APPLICATIONS

This application is a National Stage of International patent application PCT/EP2019/059883, filed on Apr. 17, 2019, which claims priority to foreign French patent application No. FR 1853324, filed on Apr. 17, 2018, the disclosures of which are incorporated by reference in their entirety.

FIELD OF THE INVENTION

The invention relates to the technical field of data processing, and in particular it relates to the validation in real time of pluviometric data.

BACKGROUND

There are many fields in which a set of equipment must be controlled dynamically in order to modify in real time the operation of the equipment depending on the situation. One particular case is that of dynamic control of a fluidic network, such as for example a sewer network.

FIG. 1 illustrates, in a simplified way, various steps that are involved in the control of a fluidic network. Generally, such a method 100 comprises at least a step 102 of forecasting operation, a step 104 of selecting a control strategy, a step 106 of generating settings and a step 108 of transmitting a regulation setting to an actuator of the fluidic network.

The step 102 of forecasting operation comprises at least steps of acquiring data, of validating the data, of reconstructing the valid data and of computing states. However, all the steps of the method are not described in more detail but those skilled in the art may for example refer to patent application FR3052567 filed by the Applicant. The validation of the data is a major technical step on which the decision-making process that follows thereafter is based.

In known methods for controlling fluidic networks, the step of validating the data takes into account either data generated by weather radars or "radar" data, or data generated by rain gauges or "gauge" data.

Radar data provide precise information on the position of a rainfall event, but they do not provide sufficiently precise information on the intensity of the precipitations. Thus, they cannot be used as reliable data in hydrology models of methods for controlling a fluidic network, during forecasting steps.

Gauge data provide information on the intensity of the precipitations but their acquisition remains subject to many chance factors related to the pluviometers, which may have mechanical faults, be poorly positioned and/or have a poor orientation that prevents rain from satisfactorily entering into the receptacle, and thus deliver inconsistent results.

Now, since the equipment must be controlled dynamically, the step of analyzing the data must be carried out in real time (this not currently being the case). In addition, the data that are used for the analysis must be reliable data. Specifically, settings based on data that are not valid may have, in any regulation process, multiple consequences whether they be economic or social.

There is thus a need for a method and a device allowing data relating to precipitations to be validated in real time.

The present invention meets this need.

SUMMARY OF THE INVENTION

One subject of the present invention relates to a computer-implemented method allowing precipitation-related data to be validated in real time.

The present invention aims to overcome the limits of the known techniques by providing a method and a device the general principle of which consists in crossing, in a geographic and time window, information of different nature and origin, allowing precipitation-related data that are valid to be singled out.

To obtain the sought results, a computer-implemented method for validating data delivered by a rain gauge is provided. In one embodiment, the method comprises steps of:
  receiving, in a defined time window, pluviometric data from a gauge and weather data from at least one weather radar;
  computing a coefficient of gauge/radar similarity between the pluviometric data received from said gauge and the weather data received from said at least one weather radar;
  comparing the value of the coefficient of obtained gauge/radar similarity to a threshold gauge/radar value; and
  validating the pluviometric data of said gauge if the value of the coefficient of gauge/radar similarity is higher than or equal to the threshold gauge/radar value.

According to embodiments of the method, alternatively or in combination, the step of computing a coefficient of gauge/radar similarity consists in carrying out pre-processing of the received data, allowing a coefficient of gauge/radar similarity between pluviometry signals recorded by the gauge and pluviometry signals of said at least one radar that were extracted at the position of said gauge to be computed, said signals being recorded in said time window.

According to embodiments of the method, alternatively or in combination, the coefficient of gauge/radar similarity is a statistical criterion measuring similarity chosen from the following criteria: index-of-agreement criterion, Nash-Sutcliffe criterion and cross-correlation criterion.

According to embodiments of the method, alternatively or in combination, the received data relate to a precipitation intensity or to a precipitation location.

According to embodiments of the method, alternatively or in combination, if the coefficient of gauge/radar similarity is lower than the threshold gauge/radar value, the method comprises, after the comparing step, steps of:
  identifying, in a given geographic region, a set of neighboring gauges of said gauge;
  determining, among the neighboring gauges, those belonging to the same rain cell as said gauge, a rain cell containing gauges the weather data of which, as received from said at least one radar, at the positions of these gauges are similar over said time window;
  computing a coefficient of gauge/gauge similarity between the pluviometric data of said gauge and the pluviometric data of each of the neighboring gauges belonging to the same rain cell;
  collating the results of the computations of the coefficients of gauge/gauge similarity to obtain a coefficient-of-gauge/gauge-similarity value;
  comparing the collated value of the coefficient of gauge/gauge similarity to a threshold gauge/gauge value; and validating the pluviometric data of said gauge if the value of the coefficient of gauge/gauge similarity is higher than or equal to the threshold gauge/gauge value. In one embodiment, the collating step consists in selecting the maximum value or the minimum value of the coefficients of gauge/gauge similarity or in taking an average of the values of the coefficients of gauge/gauge similarity.

According to embodiments of the method, alternatively or in combination, if the value of the coefficient of gauge/gauge similarity is lower than the threshold gauge/gauge value, the method comprises, after the step of comparing the value of the coefficient of gauge/gauge similarity, a step of invalidating the data of said gauge.

According to embodiments of the method, alternatively or in combination, the coefficient of gauge/gauge similarity is a statistical criterion measuring the similarity between two time-dependent signals.

According to embodiments of the method, after the step of receiving pluviometric data and radar weather data, the method comprises a step of comparing, for said gauge and for said at least one radar, rainfall accumulations to a rain threshold in order to determine a weather context vis-à-vis the presence of rain or the absence of rain, then performing the steps of computing the coefficient of gauge/radar similarity if the weather context is the presence of rain.

According to embodiments of the method, alternatively or in combination, after the step of comparing rainfall accumulations to a rain threshold, the method comprises a step of validating the pluviometric data of said gauge if the weather context is the absence of rain, then repeating the steps of receiving data.

According to embodiments of the method, alternatively or in combination, if the comparison of the rainfall accumulations to a rain threshold does not allow a weather context vis-à-vis the presence or absence of rain to be defined, and is an indeterminate context, the method consists in carrying out steps allowing the indeterminate states to be processed.

According to embodiments of the method, alternatively or in combination, the duration of all of the steps in order to validate the data of said gauge is a parameterizable period.

According to embodiments of the method, alternatively or in combination, the method comprises a step of classifying said gauge as a faulty gauge if it delivers invalid data over a plurality of periods.

The invention also covers a computer program product comprising a program, said program comprising code instructions allowing the steps of the method as claimed in any one of the claims to be performed, when said program is executed on a computer.

According to another aspect, the invention covers a system allowing, among a plurality of gauges able to deliver pluviometric data, gauges delivering valid data to be determined, the plurality of gauges covering a given region, the system comprising means for implementing the steps of the method as claimed in any one of the claims.

Advantageously, the claimed method and system may be applicable to the field of fluidic networks and in particular the use thereof in a method for controlling a fluidic network that comprises at least one step of validating rain-gauge data.

Another advantageous application of the method and system of the invention is the field of weather forecasts and in particular the use thereof in a method for forecasting floods that comprises at least one step of validating rain-gauge data.

BRIEF DESCRIPTION OF THE DRAWINGS

Other features and advantages of the invention will become apparent on reading the following description and from the figures of the appended drawings, in which.

DETAILED DESCRIPTION

Figure 1:
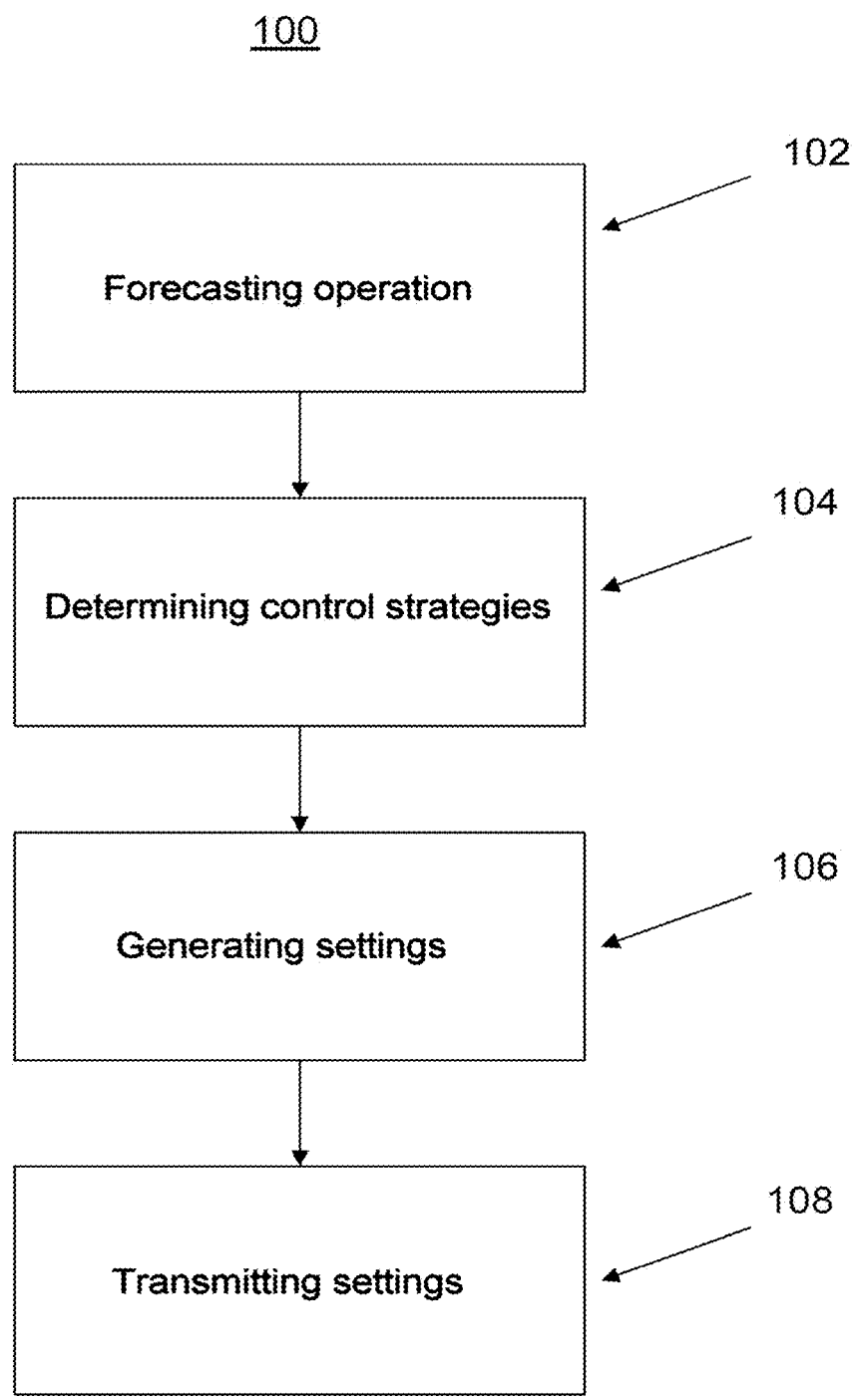
FIG. 1 schematically illustrates various steps involved in a known method for controlling a fluidic network.
Figure 2:
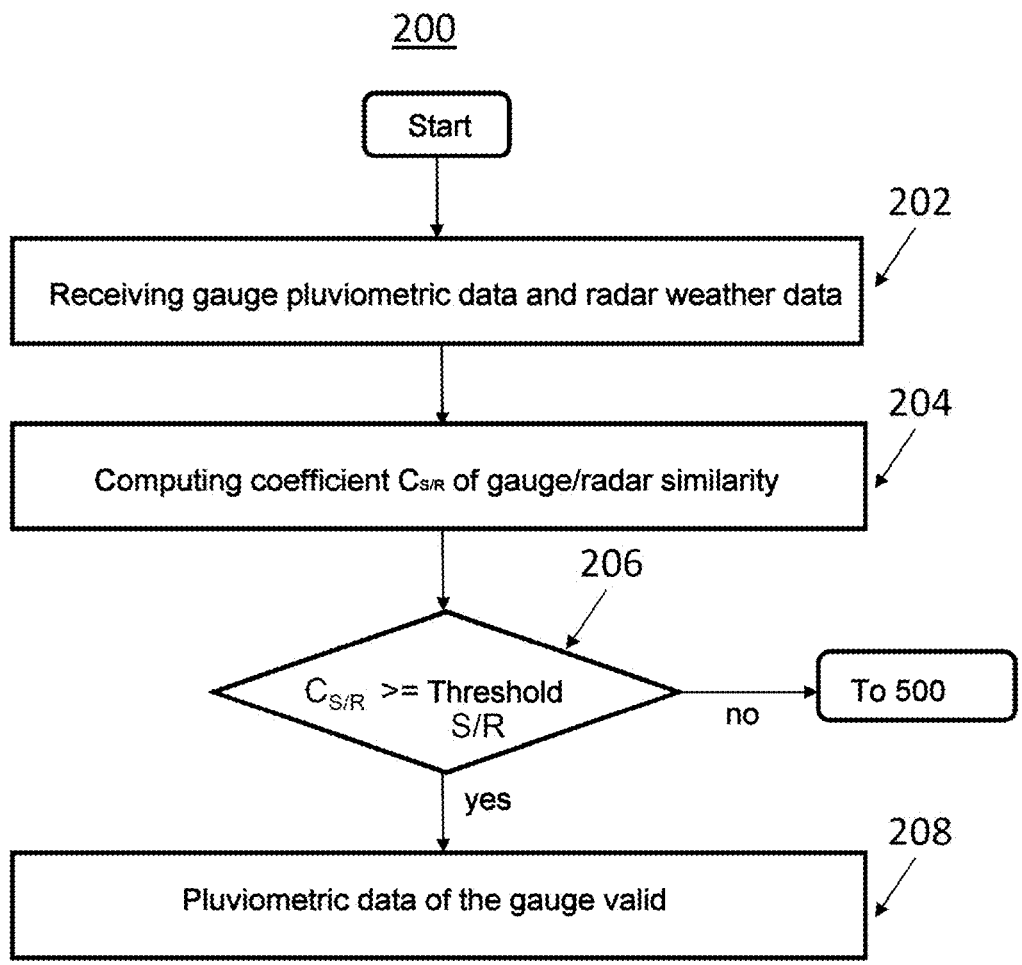
FIG. 2 shows a sequence of steps of the method of the invention according to one embodiment.

Generally, the principle of the invention consists in validating the pluviometric data delivered by a gauge, if they are consistent, according to a suitable coefficient of similarity, with the weather data delivered by a radar at the site of the gauge. FIG. 2 shows a sequence 200 of steps of the method of the invention according to one embodiment. The steps may be carried out on a computer or on a dedicated computing platform of a fluidic-network control system comprising processors configured to implement the method and allowing pluviometric data to be collected or received and/or acquired from gauges and weather data to be collected or received and/or acquired from at least one radar. Such a computer or computing platform comprises components that are specifically programmed by code instructions to perform the steps of the method. The system may also comprise various servers allowing the data to be collected, stored and processed.

Figure 3:
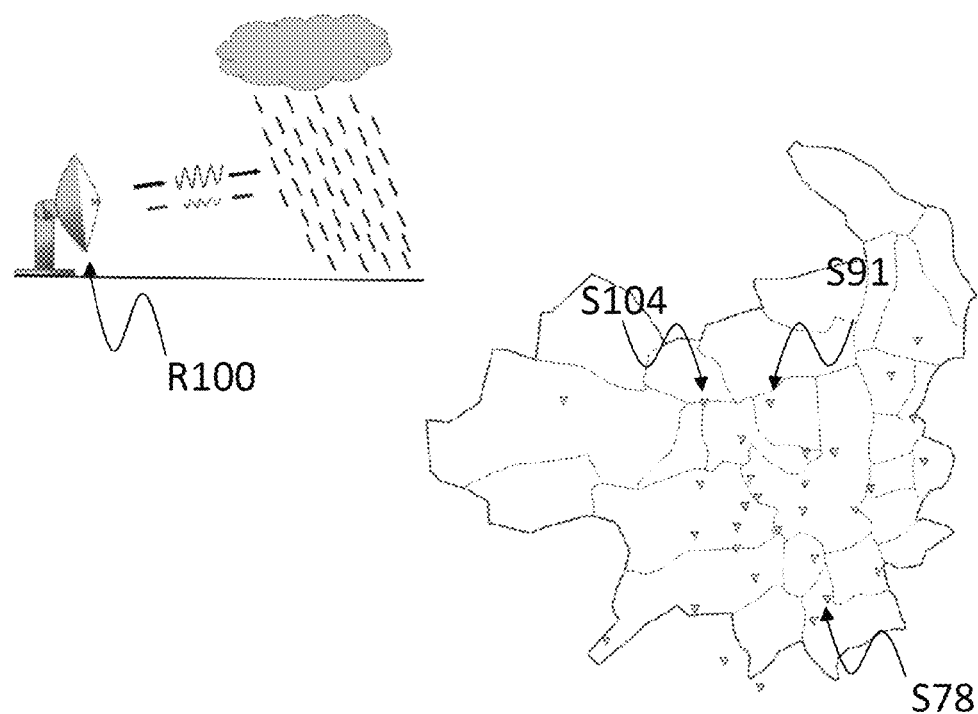
FIG. 3 illustrates, for one geographic region, locations of a plurality of rain gauges and of a radar.

For the sake of simplicity, the method is described with respect to one gauge but the principles remain applicable to a plurality of gauges. FIG. 3 illustrates a geographic region comprising a plurality of rain gauges and at least one weather radar (R100) able to observe precipitations remotely using radio waves. The operation of a weather radar mainly consists in periodically emitting an electromagnetic pulse of very short duration and in listening for the echoes returned by the particles of precipitations: raindrops, snowflakes, hailstones, etc. The time that passes between the emission of the pulse and the reception of the echo allows the position, intensity and movement of the precipitations to be determined. In FIG. 3, for the sake of clarity only a few gauges (S78, S91, S104) have been given reference numbers, but all of the gauges in a geographic region, with the position of each gauge, have been shown.

Figure 4:
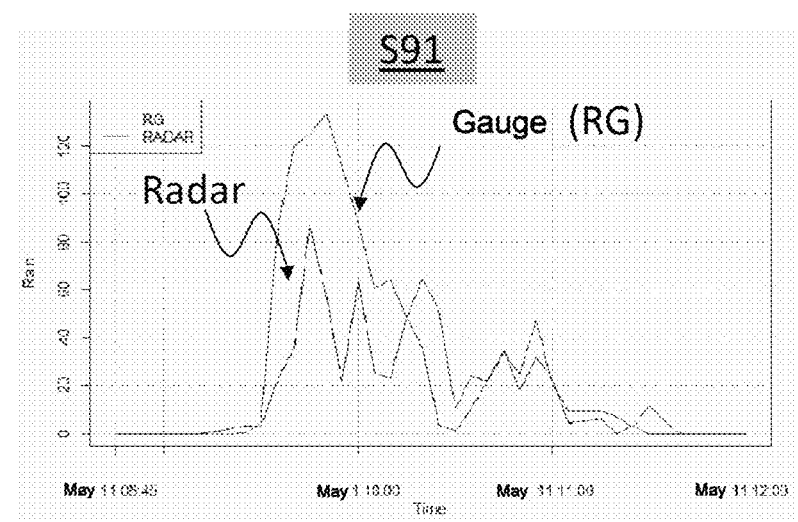
FIG. 4 illustrates acquisition signals for pluviometric data of a gauge and for weather data of a radar in a defined time window.

The method 200 starts with a step 202 of acquiring or receiving, in a time window Δt, raw data: pluviometric data for a gauge, for example the data of the gauge S91, and radar weather data corresponding to the position of this gauge S91. According to variant embodiments, the received raw data may relate to the intensity of the precipitations, for example a value in millimeters over a time of 5 minutes, or relate to the location of the precipitations. FIG. 4 illustrates, for a given time window, time-dependent acquisition signals for gauge pluviometric data (of gauge S91 in the example) and for radar weather data.

In a following step 204, the method allows a coefficient '$C_{S/R}$' of gauge/radar similarity between the gauge data and the radar data to be computed. The criterion or coefficient of similarity is a dimensionless statistical criterion of known type, for input data that are two time-dependent (pluviometric and radar) signals sampled over time at the same frequency.

In one embodiment, the computing step consists in carrying out pre-processing of the received raw data so as to compute a coefficient of gauge/radar similarity between pluviometry signals recorded by the gauge in the time window Δt and pluviometry signals of the radar that were extracted at the position of the gauge for the time window Δt.

The pre-processing of the raw data may also comprise operations of checking the dataset, and in particular checking whether values are missing or resampling the signal at a given frequency in order to allow the statistical analysis. On the basis of the radar data, which are spatialized data, the pre-processing may consist in extracting a time-dependent signal at a point (at the position of the pluviometer), with a view to carrying out the analysis.

In one embodiment, the coefficient $C_{S/R}$ of gauge/radar similarity is a statistical criterion measuring similarity. According to various variants of implementation, the coefficient of similarity may be computed using:

a cross-correlation equation (1) such as:

$$R = \frac{<RG(t) - Radar(t)> - <RG(t)> <Radar(t)>}{\sqrt{<RG^2(t)> - <RG(t)>^2} \sqrt{<Radar^2(t)> - <Radar(t)>^2}} \quad (1)$$

where RG(t) corresponds to the time-dependent signal of the rain gauge in the time window in question,
and Radar(t) corresponds to the time-dependent radar signal, which is reconstructed from the spatialized datum (radar image), at the position of the rain gauge.

a Nash-Sutcliffe equation (2) such as:

$$E = 1 - \frac{\Sigma(Radar(t) - RG(t))^2}{\Sigma(RG(t) - \overline{RG(t)})^2} \quad (2)$$

an index-of-agreement equation (3) such as:

$$IA = 1 - \frac{<(Radar(t) - RG(t))^2>}{<(|Radar(t) - <Radar(t)>| + |RG(t) - <RG(t)>|)^2>} \quad (3)$$

Returning to FIG. 2, after the step of computing the coefficient of similarity, the method allows, in a following step 206, the value of the coefficient $C_{S/R}$ of obtained gauge/radar similarity to be compared to a threshold gauge/radar-similarity value S/R.

The threshold value may be parameterizable depending on the results of the algorithm during its operation. The type of climate and therefore the typology of the rain, and the density of pluviometers in the region of study or even the precision of the radar datum are all parameters that may change the value of the thresholds from one site to the next. The initial thresholds may be defined on the basis of a study of historical data, and the values may then be refined depending on the results of the algorithm during its operation.

In one embodiment, a threshold condition for the Nash-Sutcliffe criterion (2) is: E>0.

In one embodiment, a threshold condition for the cross-correlation criterion (1) or the index-of-agreement criterion (3) is: R or IA>[0.5, 0.6].

If the value of the coefficient of similarity obtained in the computing step 204 is higher than or equal to the predefined threshold value S/R, the method allows, in the following step 208, the data delivered by the gauge to be validated. Gauge data considered valid may then be taken into account in subsequent processes, such as forecasting steps.

Thus, the method is carried out over a period [t−Δt] and the signal of the gauge is validated at the time t.

In one embodiment, the duration of all of the steps in order to validate the data of a gauge is a parameterizable period, which depends on the type of rainfalls in the region of study (intense and short rainfalls or less intense but longer rainfalls for example), and depends on real-time constraints specific to the region of study. In an application where the pluviometric data are used to anticipate the hydraulic state of a sewer network or of a water course, the maximum response time permitted for carrying out the validation method of the present invention will be dependent on the maximum delay in the response of the forecasting system for responding to the events.

In one particular embodiment, the data are acquired over a period of 5 minutes, and the method of the invention generates a validation result every 15 to 30 minutes.

In one embodiment, the method comprises a step of classifying a gauge as a faulty gauge if it delivers invalid data over a plurality of periods, and thus excluding the data that it delivers from any subsequent process. The number of periods before a gauge is flagged as faulty may be modified depending on prior results.

If the value of the coefficient of similarity obtained in the computing step 204 is lower than the predefined threshold value S/R, or branch 'no' of step 206, advantageously the method allows, at this stage, the data of the gauge not to be invalidated, considering that it is a question of an indeterminate state, and continues with steps 500 of deeper analysis.

Figure 5:
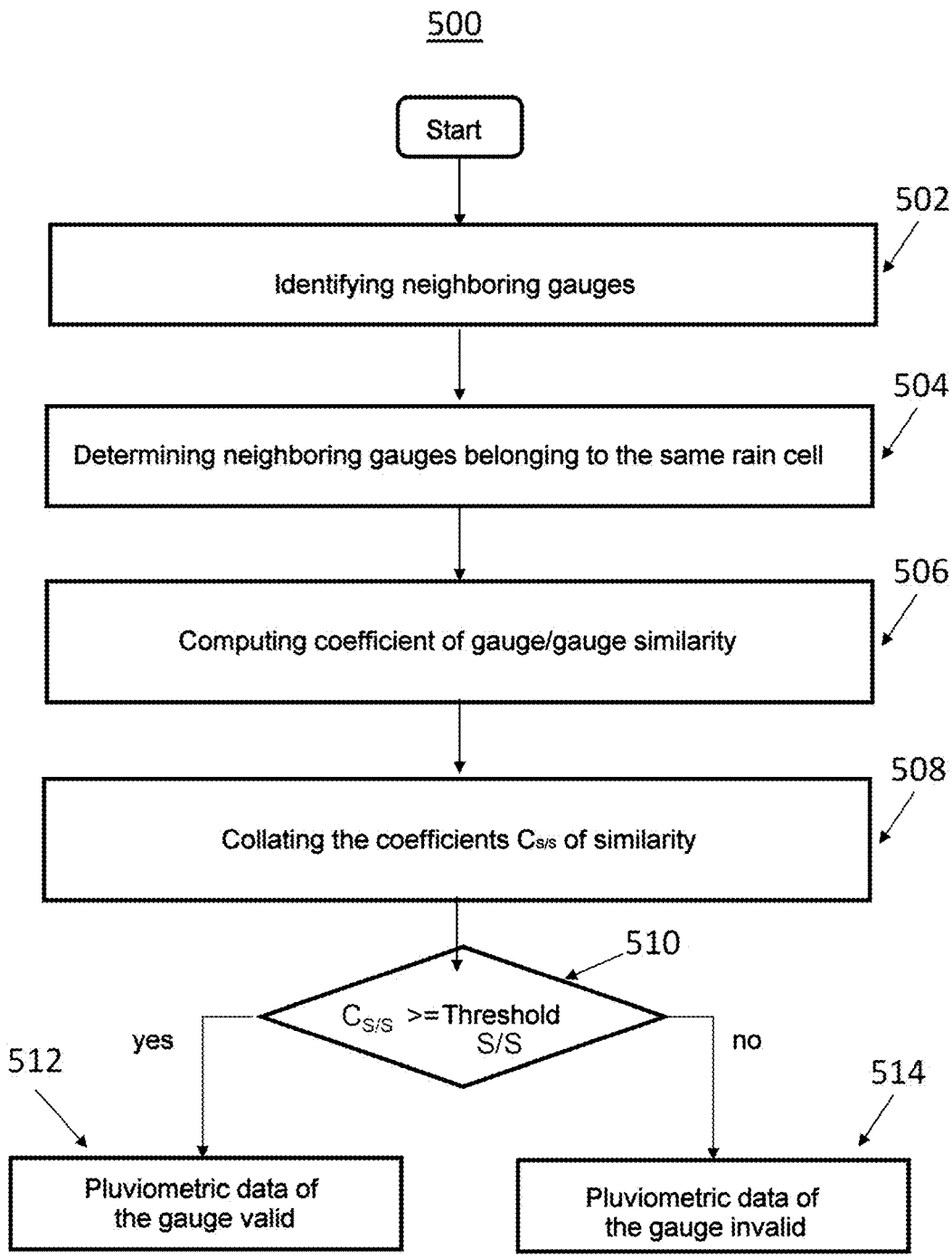
FIG. 5 shows a sequence of steps of the method of the invention allowing indeterminate states to be processed.

FIG. 5 shows a sequence 500 of steps of the method of the invention allowing indeterminate states to be processed.

As described above, when the value of the coefficient of gauge/radar similarity is lower than the predefined gauge/radar threshold value, or branch 'no' of step 206, the data of the gauge cannot be validated. The method comprises a step 502 of identifying a set of neighboring gauges of the analyzed gauge. The neighborhood of a gauge may be defined for a given perimeter about the gauge. All of the gauges in a geographic region and their locations being cataloged, the distance between gauges may be computed.

The method continues with a step 504 of determining, among the neighboring gauges of the analyzed gauge, those belonging to the same rain cell as the gauge. In the context of the present invention, a rain cell is defined as a group of gauges the extracted weather data of which at their respective position over a given time window are similar, i.e. for which a criterion of similarity between the signals of each gauge is higher than a threshold (i.e. the signals are similar in terms of variation and intensity).

Once the gauges of a given rain cell have been identified, the method allows, in a following step 506, a coefficient of gauge/gauge similarity between the pluviometric data of the analyzed gauge and the pluviometric data of each of the neighboring gauges belonging to the same rain cell to be computed.

In one embodiment, the coefficient of gauge/gauge similarity is a statistical criterion measuring the similarity between two time-dependent signals originating from two neighboring gauges of a given rain cell. According to various variants of implementation, the coefficient of similarity may be computed using:

a cross-correlation equation such as:

$$R = \frac{<RG_2(t) \cdot RG_1(t)> - <RG_2(t)> \cdot <RG_1(t)>}{\sqrt{<RG_2^2(t)> - <RG_2(t)>^2} \sqrt{<RG_1^2(t)> - <RG_1(t)>^2}} \quad (4)$$

a Nash-Sutcliffe equation such as:

$$E = 1 - \frac{\Sigma(RG_1(t) - RG_2(t))^2}{\Sigma(RG_2(t) - \overline{RG_2(t)})^2} \quad (5)$$

an index-of-agreement equation such as:

$$IA = 1 - \frac{<(RG_1(t) - RG_2(t))^2>}{<(|RG_1(t) - <RG_1(t)>| + |RG_2(t) - <RG_2(t)>|)^2>} \quad (6)$$

where $RG_1$ and $RG_2$ are the time-dependent signals of the two gauges to be compared.

In a following step 508, the method allows the results obtained for the various coefficients of gauge/gauge similarity to be collated. In one embodiment, the collation of the results may consist in selecting the maximum of the results. The collated coefficient of similarity may also be an average of the various coefficients or else the minimum.

In a following step 510, the method allows the value of the selected coefficient '$C_{S/S}$' of gauge/gauge similarity to be compared to a threshold gauge/gauge value 'S/S'.

Next, the method allows:

the pluviometric data of said gauge to be validated if the value of the coefficient of gauge/gauge similarity is higher than or equal to the threshold gauge/gauge value (512); or if the value of the coefficient of gauge/gauge similarity is lower than the threshold gauge/gauge value, the method allows the data of said gauge to be invalidated (514).

Figure 6:
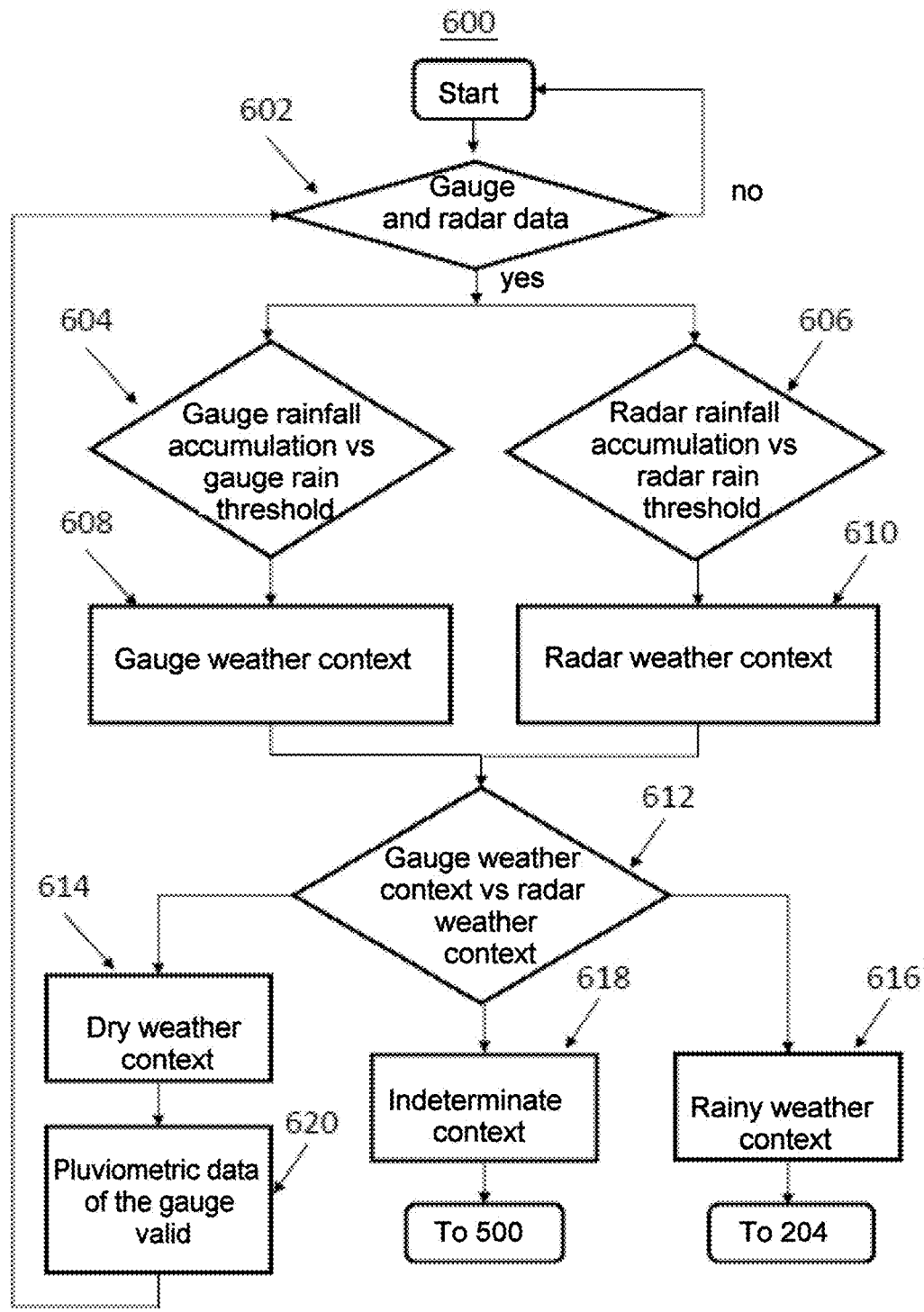
FIG. 6 shows a sequence of steps of the method of the invention allowing a weather context to be determined.

FIG. 6 shows a sequence 600 of steps of the method of the invention allowing a weather context to be determined.

After a step 602 in which the reception of raw pluviometric and weather data is confirmed, the method comprises a step 604 of comparing a rainfall accumulation for the analyzed gauge to a predefined gauge rain threshold, and a step 606 of comparing a rainfall accumulation determined by the radar to a predefined radar rain threshold.

The result of each comparison allows a weather context to be respectively delivered by the gauge 608 and by the radar 610.

The method then allows, in the step 612, the weather contexts of the gauge and of the radar to be compared. The contexts may be identical and reveal a context referred to as a 'dry weather' context 614, be identical and reveal a context referred to as a 'rainy weather' context 616, or be contradictory and reveal a context referred to as 'indeterminate' 618.

If the context is dry weather, the method allows, in a following step 620, the pluviometric data of the analyzed gauge to be validated, then the step 602 of receiving data to be repeated.

If the context is rainy weather, the method allows the steps (204) onwards of computing the coefficient of gauge/radar similarity to be carried out.

If the context is indeterminate, the method allows the steps 500 allowing indeterminate states to be processed to be carried out.

Thus, an example of implementation of the method of the invention allowing data delivered by a rain gauge to be validated has been described. Those skilled in the art may consider that the method may be carried out synchronously for a plurality of gauges positioned in a given geographic region, in order to determine all of the gauges producing valid data that may be used in subsequent processes such as those employed to control fluidic networks. The described example does not provide any details as to the technical features of the rain gauges, other than that they are gauges able to deliver pluviometric data. Thus, the method may or may not be carried out with gauges having a potentially configurable and parameterizable wireless mode of data communication.

The invention claimed is:

1. A computer-implemented method for validating data delivered by a rain gauge, the method comprising steps of:

receiving, in a defined time window, pluviometric data from a gauge and weather data from at least one weather radar;

computing a coefficient of gauge/radar similarity between the pluviometric data received from said gauge and the weather data received from said at least one weather radar;

comparing the value of the coefficient of obtained gauge/radar similarity to a threshold gauge/radar value; and validating the pluviometric data of said gauge if the value of the coefficient of gauge/radar similarity is higher than or equal to the threshold gauge/radar value; or if the coefficient of gauge/radar similarity is lower than the threshold gauge/radar value:

identifying, in a given geographic region, a set of neighboring gauges of said gauge;

determining, among the neighboring gauges, those belonging to the same rain cell as said gauge, a rain cell containing gauges the weather data of which, as received from said at least one radar, at the positions of these gauges are similar over said time window;

computing a coefficient of gauge/gauge similarity between the pluviometric data of said gauge and the pluviometric data of each of the neighboring gauges belonging to the same rain cell;

collating the results of the computations of the coefficient of gauge/gauge similarity to obtain a coefficient-of-gauge/gauge-similarity value;

comparing the obtained value of the coefficient of gauge/gauge similarity to a threshold gauge/gauge value; and validating the pluviometric data of said gauge if the value of the coefficient of gauge/gauge similarity is higher than or equal to the threshold gauge/gauge value.

2. The method as claimed in claim 1, wherein the computing step consists in carrying out pre-processing of the received data, allowing a coefficient of gauge/radar similarity between pluviometry signals recorded by the gauge and pluviometry signals of said at least one radar that were extracted at the position of said gauge to be computed, said signals being recorded in said time window.

3. The method as claimed in claim 1, wherein the coefficient of gauge/radar similarity is a statistical criterion measuring similarity chosen from the following criteria: index-of-agreement criterion, Nash-Sutcliffe criterion and cross-correlation criterion.

4. The method as claimed in claim 1, wherein the received data relate to a precipitation intensity or to a precipitation location.

5. The method as claimed in claim 1, comprising, after the comparing step, a step of invalidating the data of said gauge if the value of the coefficient of gauge/gauge similarity is lower than the threshold gauge/gauge value.

6. The method as claimed in claim 1, wherein the coefficient of gauge/gauge similarity is a statistical criterion measuring the similarity between two time-dependent signals.

7. The method as claimed in claim 1, wherein the collating step consists in selecting the maximum value or the minimum value of the coefficients of gauge/gauge similarity or in taking an average of the values of the coefficients of gauge/gauge similarity.

8. The method as claimed in claim 1, comprising, after the step of receiving pluviometric data and radar weather data, a step of comparing, for said gauge and for said at least one radar, rainfall accumulations to a rain threshold in order to determine a weather context vis-à-vis the presence of rain or the absence of rain, then performing the steps of computing the coefficient of gauge/radar similarity if the weather context is the presence of rain.

9. The method as claimed in claim 8, comprising, after the comparing step, a step of validating the pluviometric data of said gauge if the weather context is the absence of rain, then repeating the steps of receiving data.

10. The method as claimed in claim 8, comprising, after the comparing step, if the comparison does not allow a weather context vis-à-vis the presence or absence of rain to be defined, performing, after the comparing step, if the coefficient of gauge/radar similarity is lower than the threshold gauge/radar value, steps of:
   identifying, in a given geographic region, a set of neighboring gauges of said gauge;
   determining, among the neighboring gauges, those belonging to the same rain cell as said gauge, a rain cell containing gauges the weather data of which, as received from said at least one radar, at the positions of these gauges are similar over said time window;
   computing a coefficient of gauge/gauge similarity between the pluviometric data of said gauge and the pluviometric data of each of the neighboring gauges belonging to the same rain cell;
   collating the results of the computations of the coefficient of gauge/gauge similarity to obtain a coefficient-of-gauge/gauge-similarity value;
   comparing the obtained value of the coefficient of gauge/gauge similarity to a threshold gauge/gauge value; and
   validating the pluviometric data of said gauge if the value of the coefficient of gauge/gauge similarity is higher than or equal to the threshold gauge/gauge value; and
   further comprising, after the comparing step, a step of invalidating the data of said gauge if the value of the coefficient of gauge/gauge similarity is lower than the threshold gauge/gauge value.

11. The method as claimed in claim 1, wherein the duration of all of the steps in order to validate the data of said gauge is a parameterizable period.

12. The method as claimed in claim 11, further comprising a step of classifying said gauge as a faulty gauge if it delivers invalid data over a plurality of periods.

13. A non-transitory computer readable medium containing computer instructions stored therein for causing a computer processor to perform steps of claim 1.

14. A system allowing, among a plurality of gauges able to deliver pluviometric data, gauges delivering valid data to be determined, the plurality of gauges covering a given region, the system comprising means for implementing the steps of the method as claimed in claim 1.

15. The use of the method as claimed in claim 1 in a method for controlling a fluidic network comprising at least one step of validating rain-gauge data.

16. The use of the method as claimed in claim 1 in a method for forecasting floods comprising at least one step of validating rain-gauge data.

* * * * *